Oct. 9, 1951      F. D. PRAGER ET AL      2,570,590
SOLIDS CONTACT TANKS, DUCTS, AND CONTROLS FOR SAME
Filed Jan. 27, 1950      2 Sheets-Sheet 1
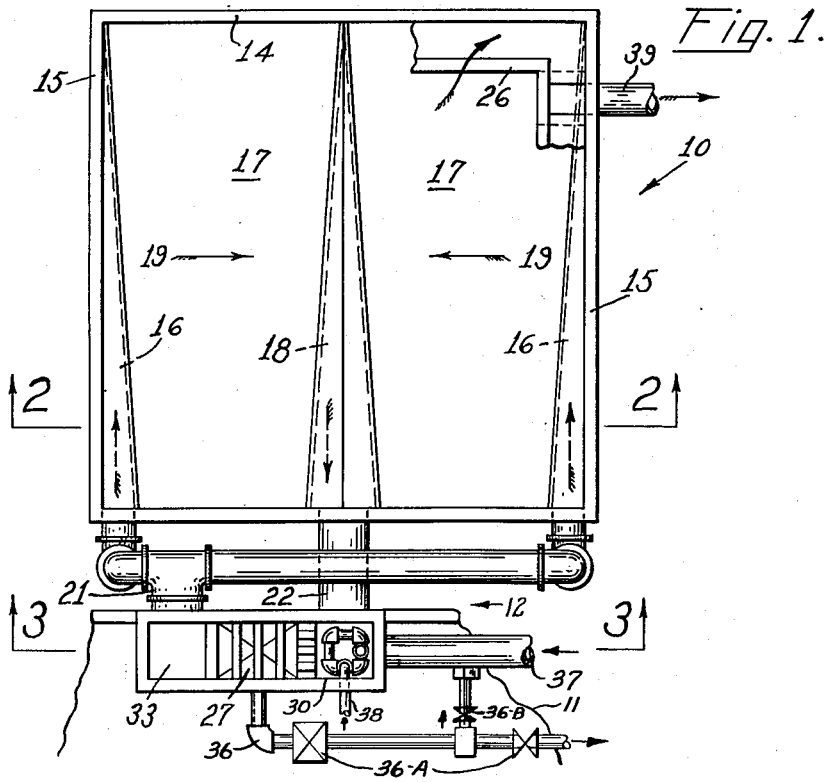
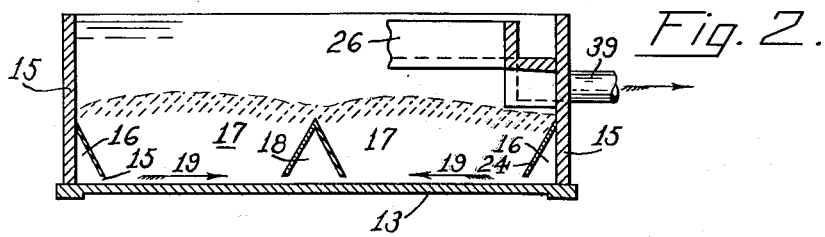
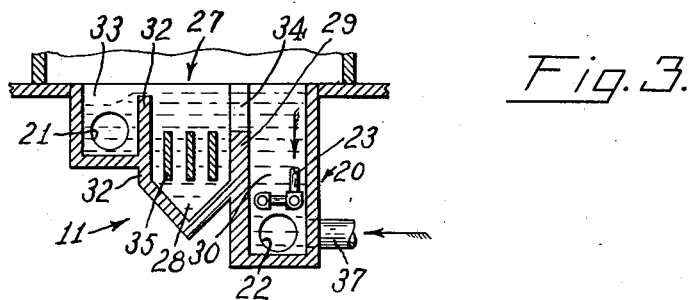
INVENTORS:
Frank D. Prager
& Roy Welter.
By F.D. Prager, Att'y

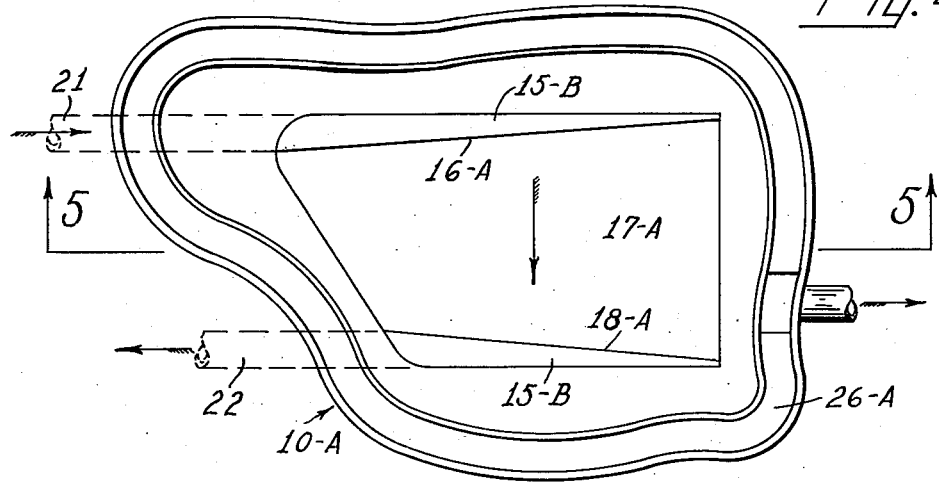
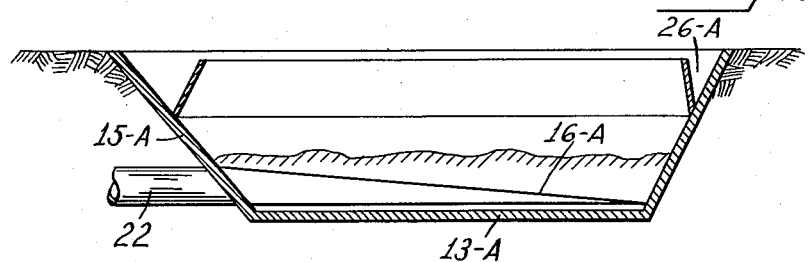
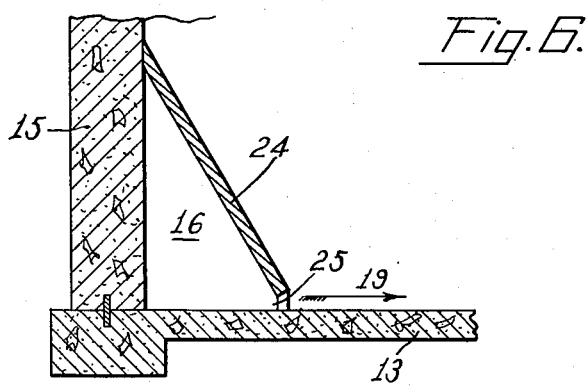

Patented Oct. 9, 1951

2,570,590

UNITED STATES PATENT OFFICE 2,570,590

SOLIDS CONTACT TANKS, DUCTS, AND CONTROLS FOR SAME

Frank D. Prager, Chicago, Ill., and Roy Welter, St. Louis, Mo.

Application January 27, 1950, Serial No. 140,804

8 Claims. (Cl. 210—16)

Our invention relates to liquid treatment as applied for instance in water softening and purification plants. It is based on a new form of what is known as the solids contact principle, sludge blanket treatment, slurry treatment, sludge filtration, and upflow clarification. We provide an improved process and apparatus for such treatment; mainly for treatment plants of the municipal type which have basins of concrete, covering considerable area and being relatively shallow.

Such relatively shallow basins are often called horizontal tanks, while the so-called upflow clarifiers are sometimes considered as predominantly vertical. The real or apparent distinction between horizontal and vertical tanks is eliminated by our design. The basins are generally horizontal; the sludge blanket is positively distributed in generally horizontal directions and the flow of water being treated is generally upward. In our horizontal basins we may utilize the well known rectangular tank design, or practically any other tank design suitable for the location of an individual plant.

We facilitate economy in tank construction and in the maintenance of an efficient plant by concentrating all the moving equipment required for the slurry treatment in a suitable building. Plain tanks of concrete, without moving equipment therein, are well known. Likewise solids contact processes are well known. However, little if anything has been done in the past to combine these two basic concepts. We do so, with the aid of stationary ducts, distributors and other simple equipment units, the necessary arrangement of which will appear from the following description.

In the drawing Fig. 1 is a diagrammatic plan view of a preferred embodiment of our invention. Figs. 2 and 3 are vertical sections thereof, taken along lines 2—2 and 3—3 respectively. Fig. 4 is a partial diagrammatic plan view of a modified embodiment and Fig. 5 is a vertical section thereof, taken along lines 5—5. Fig. 6 is an enlarged detail from Fig. 2.

Referring first to Figs. 1, 2, 3 and 6, the apparatus consists of a treatment tank 10, a separate pump, feed and control building 11 adjacent the tank, and interconnecting duct means 12. Practically all of the treatment takes place in tank 10; however, all moving equipment and auxiliary treatment devices are located in the building 11. This building will usually be covered and heated by means not shown. Being separate from the treatment tank, the building can be constructed and equipped while the tank is being built, rather than subsequently. This feature is one of those tending to make the present upflow clarifier plant particularly economical. Our basic arrangement also eliminates cost elements such as the expensive superstructure of tanks previously used for similar purposes.

The treatment tank 10 is shown as substantially square, this form being most economical. It can also be described as generally rectangular. It comprises a substantially flat and horizontal bottom 13, two end walls 14 upstanding from the end portions of this bottom and two side walls 15 upstanding from the side portions of this bottom. In some instances the tank is roofed over by well known means not shown. It is usually unheated, as distinguished from the building 11; any roof provided for the tank can be quite independent from this building. In this respect our present construction is more economical than that of our earlier Patent No. 2,465,980.

We provide a plurality of slurry distributor ducts 16 extending in lower parts of the tank 10, for instance, along the two side walls 15. These distributors serve to discharge slurry into the substantially horizontal solids contact zone 17 which is formed thereby in the lower part of the tank. Circulating slurry is withdrawn from this zone by at least one slurry collector duct 18 extending in the lower part of the tank. In the preferred embodiment illustrated we use two distributors and one collector, these three ducts being parallel with one another and dividing the square tank into two generally rectangular zones which are about twice as long as wide. The three ducts, which are stationary, are the only equipment installed in our tank 10. No moving equipment is located in this tank, which accordingly can be built with the simplest and most economical construction methods. Even corner fills or ridges of concrete, which are found in some tanks of this kind, are unnecessary; in fact undesirable, for reasons which will be pointed out hereinafter.

The general direction of slurry flow in the solids zone 17 is parallel with the end walls 14, as shown by arrow 19. Accordingly the slurry takes the shortest possible path through the area of the solids contact zone 17, during each passage through the tank, this path being approximately half as long as the end wall 14. We have found it possible to make such a path about 20 to 30 ft. long and still to maintain proper distribution. Thus it will be seen that the total number of ducts can usually be quite small.

In order to provide the slurry flows 19 we use a slurry pump 20 located in the separate building 11. The discharge of the pump 20 communicates with the two distributors 16 by discharge ducts or pipes 21 while the suction of the pump 20 communicates with the single collector 18 by a suction duct or pipe 22. The pump impeller may consist of an air lift device 23 or any mechanical equivalent thereof. Air lifts are often preferred over centrifugal or axial flow impellers. They are most economical, mainly when a plurality of treatment systems is provided with air by a single compressor or blower (not shown). Furthermore, air lifts require no moving equipment in poorly accessible locations. They facilitate the precipitation of certain calcium, magnesium and iron compounds, counteract septicity, allow easy adjustment of slurry circulating velocities and promote the general efficiency of operation and maintenance in other respects. They tend to saturate the water with oxygen, removing most if not all of the carbon dioxide present or formed, whereby corrosive tendencies of the water are generally reduced and often eliminated. The hydraulic efficiency of an air lift may be relatively low, but this drawback is usually far outweighed by the advantages mentioned.

The ducts 16 and 18 are preferably formed by inclined walls 24 extending through the tank 10 adjacent and closely above the surface of the bottom 13 and arranged in inverted V form as shown. Such an inverted V is formed by the walls 24 alone in the case of the collector 18 and by the walls 15, 24 in the case of the two distributors 16. The ducts taper in width, height and cross-sectional area from the end wall 14 adjacent the building 11 to the opposite or far end wall. This tapering design is used in order to maintain a uniform slurry flow velocity in the ducts, while the amount of slurry flowing therein decreases toward the far end wall, the ducts being in communication with the solids contact zone 17 by apertures 25 spaced or extending along the ducts. A uniform flow velocity in the ducts is desirable in order to avoid the local settling out of slurry solids due to insufficient velocity and the local imposition of excessive turbulence, slurry comminution and hydraulic resistance due to excessive velocity.

A rectangular solids contact basin with a plurality of slurry collector ducts therein is known from the work of Archbutt and Deeley, as described for instance in their English Patent No. 19,829/92. Our arrangement differs by adding substantially parallel distributor ducts, and specifically by adding a plurality of such distributor ducts to every collector duct. This latter feature is also one of the distinctions between our arrangement and the relatively recent design of the Hughes Patent No. 2,245,587. This applies regardless of the form of our tank, which as mentioned can be made rectangular or otherwise. Even if it is made circular, as the tank of Hughes, it differs in arrangement. Our invention is based, in part, on the discovery that the hydraulic balance in the slurry circulation and the treatment conditions resulting therefrom are greatly improved by the use of a plurality of distributor ducts for every one collector duct, the ducts being of equal length and cross-sectional area as described.

The water of the liquid treated in tank 10 flows with the sludge blanket material formed in the solids contact zone 17 and recirculated into the solids contact zone. The water then flows upwards through the slurry blanket. It is upwardly withdrawn as a clarified overflow into suitable outlet launders 26 in the upper part of the tank. In the treatment the previously formed, suspended particles of slurry provide contacts solids or nuclei of precipitation or coagulation, as the treatment reagents react with the impurities or admixtures of the water. Large, dense and relatively uniform solid particles are formed in this manner. Such particles are kept in suspension by the practically uniform flow velocities prevailing in the slurry flow 19 through the solids contact zone 17. They are, however, not suspended with sufficient force to reach the liquid level in the tank; the flows 19 being limited to the lowermost zone of the tank.

Excess solids, also called sludge or mud, are withdrawn from the underflow which comprises the slurry circulation 19 through the solids contact zone. For reasons of economy and maintenance we have found it preferable to locate all means to this end in the separate building 11. We incorporate or install a slurry concentrator tank 27 in this building, and conduct the slurry circulation through the concentrator. The concentrator can be quite small. It is not expected to separate the circulating slurry into sludge and practically clear liquid. It only has to abstract a relatively minor part of the solids from the circulating slurry, as is well known from the work of Declercq, disclosed for instance, in English Patent No. 5,332/05.

Being small, the concentrator 27 is easily incorporated in the structure of the building 11. It can be rectangular, as shown. The sludge concentrating zone 28 within this concentrator can be separated by an end wall 29 from an equally rectangular pump pit or airlift chamber 30 forming part of the pump 20. The opposite end wall 31 of the concentrator has incorporated in its top part 32 a launder 33, discharging into the duct 21 which leads to the slurry distributors. Preferably the entire flow of the circulating slurry passes through the top part of the concentrator, being distributed over the area thereof by suitable apertures 34 in the top part of the end wall 29 at the inlet side. Stilling baffles 35 may be installed across the concentrator between the top and bottom thereof. Concentrated, settled sludge is withdrawn from said bottom by a pipe 36, controlled by suitable, well known pump or valve means 36–A which is located in the building 11 and thus protected from service and maintenance trouble due to inclement weather and the like.

The raw liquid to be treated and the treating reagents are added to the slurry circulation, according to principles known from said work of Declercq, and preferably by adding them separately to the pump pit 30 through inlet means 37 and 38 respectively. These inlet means are usually equipped with well known controls, not shown, and are protected from bad weather and the like by being located in the building 11.

The outlet 39 for treated liquid can be connected with the overflow launder 26 at any desired point. This outlet may lead to final treatment or storage units, not shown, or directly to the point or points of use for the treated liquid.

In the embodiment of Figs. 4 and 5 we have modified the arrangement in several respects. We have made the tank 10A and overflow launder 26A quite irregular in plan view. The walls 15A are inclined rather than vertical. The slurry ducts and intermediate solids contact zone 16A, 17A, 18A are arranged between approximately straight edges 15B of the tank bottom 13A.

Furthermore, we here show only one slurry collector duct 18A and one distributor duct 16A; the distributor, however, being longer. Again, we have in mind the aforementioned hydraulic balance in the circulating slurry flow, and the process conditions resulting therefrom. Among these conditions are the slurry velocities in the duct apertures and in the solids contact zone. It is desirable to make the slurry velocity in the distributor equal, or approximately equal the slurry velocity in the collector, and therefore to use approximately equal velocities in the respective apertures. Nevertheless, it is desirable and even necessary to provide appreciably greater headloss in the discharge outlet of the slurry pump than in the suction inlet.

General principles concerning such velocities and the process conditions resulting therefrom are known for instance from the aforesaid patents of Archbutt-Deeley and Declercq and from our own prior Patents Nos. 2,353,358, 2,426,804 and 2,444,671. Our present invention, in its general aspect, provides ducts and apertures suitable to distribute and collect slurry at predetermined spaced locations in a tank of regular or irregular shape. It uses a total cross-sectional area of these ducts and apertures such as to provide approximately equal velocities of distribution and collection, but to provide less headloss in collection than in distribution. This lesser headloss is provided by a more favorable ratio of wetted perimeter to cross-sectional area on the collector side. This again can be produced by fewer, shorter or more favorably shaped collector ducts, as compared with the distributor ducts.

While the two ducts of Figs. 4 and 5 appear as more economical than the three or more ducts of Figs. 1 and 2, these Figs. 1 and 2 are preferred as to efficiency of operation, except if the tank of Figs. 4 and 5 is equipped with transverse stilling baffles, not shown, which tend to make it more expensive. This is due to the fact that the slurry underflow 19 tends to induce secondary flows through the entire tank. Such secondary flows may be relatively slow but they are still dangerous if the velocity is sufficient to raise local boil-ups of suspended slurry from the top of the sludge blanket to the liquid level. As mentioned before, we prefer not to install corner fills; this is one expedient whereby we counteract excessive secondary flow velocities. Another important expedient consists in the use of different directions for the primary slurry flows 19, as shown; desirably by the use of a greater number of slurry distributor ducts. Of course we prefer to avoid an excessive number of ducts, for reasons of economy.

A process condition of prime importance consists in the velocity of the slurry underflows 19 through the solids contact zone 17. In the aforementioned Archbutt-Deeley design the slurry underflows have quantities and therefore velocities decreasing frrom the inlet end towards the far end of the tank. In the aforementioned Hughes design the underflows from different apertures cover annular areas of different size and accordingly have velocities depending largely on the location and on the detail arrangement of the different apertures. We prefer uniform velocities slightly higher than those in the ducts. Such uniform velocities are most easily adjusted to the optimum magnitude; that is to a velocity rapid enough to suspend the slurry solids in the solids contact zone 17 but slow enough to avoid boil-ups. Therefore we discharge slurry uniformly along the entire length of the distributors 16 or 16A, and equally collect slurry uniformly along the entire length of the collector 18. Thus we obtain parallel slurry flows 19 of uniform velocity over the bottom 13. Of course we are not referring to strict uniformity over every square inch of the bottom, but to substantial uniformity for the purposes in hand. Attention is directed to the fact that our process conditions are equally uniform, over the entire zone 17, as to distribution of treatment reagents.

These principles are believed to be new. Moreover, they provide a new and simplified manner of quantitatively designing the tank and equipment.

Solids contact tanks for municipal water treatment, which are typical and important as examples of apparatus of the present type, are usually designed for a capacity flow rate of raw water amounting to about two gallons per minute per square foot of sludge blanket area (2 G. P. M./sq. ft.); with variations of about 50% upwards and downwards depending on local conditions. Capacity ratings lower than about 1 G. P. M./sq. ft. do not require sludge recirculation and suspension and the pertinent equipment while ratings higher than about 3 G. P. M./sq. ft. are generally unsafe for typical requirements as to raw and treated water. It is further usual to design such clarifiers for a slurry recirculation amounting to about 300% of the capacity flow of water; again, with a variation of about 50% upwards and downwards.

Our new system provides greater uniformity of slurry flow over the tank area than earlier sludge blanket systems did. Therefore the proper recirculation rates are slightly different. They depend mainly on the width of our sludge blanket zone 17; secondarily on the depth of that zone, which in turn depends on the number of ducts. Therefore we prefer to rate our recirculation flows in terms of volume (for instance gallons per minute) divided by the total length of distributor 16 (for instance in feet). In the treatment under consideration we generally prefer recirculation of about 200 G. P. M. per foot of total distributor length (200 G. P. M./ft.), with upwards and downwards variation of 50%. This is usually less than the recirculation used in slurry tanks known to the art, with resulting savings in power consumption, size of conduits, and pump equipment required.

The preferred cross sectional dimensions of our distributors, collectors and other ducts 16, 18, 21, 22 are such as to maintain velocities of about 1 to 3 ft. per second in the slurry flow therein.

The ducts and passages of the different embodiments described herein are simple to form with standard methods of tank construction. Moreover, they facilitate the application of simple but effective controls, for normal operation and for the purpose of overcoming starting loads and occasional overloads without undue disturbance of the sludge blanket, or delay in correcting exceptional conditions.

In case of such disturbance it is important, in the present method like in all slurry methods, to compensate for disturbing influences promptly and adequately. For instance, if the condition of the raw liquid changes chemically or otherwise it is imperative to make proper compensating changes in the chemical feed, at once, unless there shall be either waste of chemicals, or improper liquid treatment, or both. It is important that such compensating changes should reach the entire treatment zone as rapidly as possible. For instance if raw water has been coagulated and clarified with alum at a pH of 6 and this pH rises to 6.3 it may be most important to correct this new pH throughout the tank, at once, unless poor clarification shall result. Such prompt correction is facilitated by the present design; only seconds are generally required, with an adequate chemical feed system, to feed the new proper mixture through the ducts 21 and uniformly to the entire tank area or solids contact zone 17.

Occasionally an overload occurs for purely physical reasons. Pursuant to a shut-down a starting load must be overcome. This is most efficiently done by passing sludge from pipe 36 into pump pit 30, through a suitable sludge bypass 36–B. Another frequent and serious cause of overloading is connected with the necessity for backwash operations in filters following our treatment tanks. The backwash flow for any one filter unit generally requires several times the amount of water—preferably pretreated water—that is normally filtered in such unit. The polluted flow discharged from the filters during the backwash is often too voluminous and rapid to be carried away by the normal sewer system. On the other hand, separate storage of water required for such a backwash or of that discharged therefrom is very expensive. Therefore it is preferable to use the sludge blanket clarifier as a kind of storage tank for this purpose. In doing so, we avoid overloading the treatment tank during the filter backwash, by temporarily reducing the slurry circulation, for instance by proper adjustment of the air lift 23. It should be noted that such adjustment can be effected within the building 11, greatly simplifying the service and maintenance of the system.

Various other modifications can be applied to the apparatus and process described. We claim:

1. Process of liquid treatment comprising the steps of producing a slurry of contact solids; discharging a plurality of spaced, distributed, generally uniform, horizontal flows of such slurry into a solids contact zone, in different directions; passing said flows through the solids contact zone at substantially uniform velocities; collecting such flows into one flow; passing the collected flow into a pump, feed and control zone to pump it back to the solids contact zone; separating the returning flow into a plurality of flows again; passing the separated flows to the solids contact zone for repeated discharge; maintaining substantially uniform velocities in the flows passing to and from the pump, feed and control zone but maintaining a lower headloss in the former than in the latter; feeding liquid to be treated and required treatment reagents into the circulating slurry in the pump, feed and control zone, whereby additional contact solids are produced; withdrawing liquid upwardly from the solids contact zone; and withdrawing contact solids from the circulating slurry.

2. Process according to claim 1, wherein said flows discharged into the solids contact zone are parallel with one another in each direction while the different directions are opposed to each other; the solids contact zone being generally rectangular.

3. Process according to claim 1, wherein contact solids are withdrawn from the slurry in said pump, feed and control zone.

4. Process according to claim 3, wherein contact solids withdrawn from the slurry are temporarily returned to said circulating slurry, in said pump, feed and control zone.

5. Apparatus for liquid treatment comprising a horizontal treatment tank with a flat bottom; a separate pump, feed and control building adjacent the tank; pump means in said building; at least one apertured slurry collector duct extending adjacent the surface of the bottom, communicating with the tank and forming part of the suction inlet of the pump; at least one apertured slurry distributor duct similarly extending and communicating and forming part of the discharge outlet of the pump, so that on operation of the pump slurry flows pass from one duct to the other substantially over the entire bottom, and back in a closed cycle; the ducts and apertures being so dimensioned as to provide, incident to such flows, less headloss in the suction inlet than in the discharge outlet; means in said building to feed liquid to be treated and required treatment reagents into said flows; overflow means in the upper part of the tank to withdraw treated liquid; and outlet means for slurry solids, interposed in said flows.

6. Apparatus according to claim 5, wherein the apertured distributor and collector ducts extend parallel with one another, in the treatment tank.

7. Apparatus according to claim 5, wherein the outlet means for slurry solids comprises a small concentrator tank in said building, directly adjacent said pump means.

8. Apparatus according to claim 7, wherein said concentrator tank has a slurry inlet in its upper part, a slurry outlet in its upper part opposite the inlet, a sludge outlet in its lower part, and stilling baffles between said upper and lower parts.

FRANK D. PRAGER.
ROY WELTER.

REFERENCES CITED

The following references are of record in the file of this patent:

UNITED STATES PATENTS

| Number | Name | Date |
|---|---|---|
| 2,128,569 | Velz | Aug. 30, 1938 |
| 2,245,587 | Hughes | June 17, 1941 |
| 2,353,358 | Prager | July 11, 1944 |
| 2,400,598 | Prager | May 21, 1946 |
| 2,419,004 | Bieker | Apr. 15, 1947 |
| 2,426,804 | Welter | Sept. 2, 1947 |
| 2,444,671 | Prager | July 6, 1948 |
| 2,452,991 | Butcher | Nov. 2, 1948 |
| 2,465,980 | Prager | Mar. 29, 1949 |

FOREIGN PATENTS

| Number | Country | Date |
|---|---|---|
| 19,829 | Great Britain | 1892 |
| 1,791 | Great Britain | 1889 |
| 5,332 | Great Britain | 1905 |